(12) United States Patent
Shin et al.

(10) Patent No.: US 10,812,824 B2
(45) Date of Patent: Oct. 20, 2020

(54) ENCODING APPARATUS AND METHOD, AND DECODING APPARATUS AND METHOD

(71) Applicant: PIXTREE TECHNOLOGIES, INC., Gwangju (KR)

(72) Inventors: Jae Seob Shin, Seoul (KR); Sung Gul Ryoo, Seoul (KR); Se Hoon Son, Seoul (KR); Sun Young Lee, Seoul (KR)

( * ) Notice: Subject to any disclaimer, the term of this patent is extended or adjusted under 35 U.S.C. 154(b) by 0 days.

(21) Appl. No.: 16/305,952

(22) PCT Filed: Jun. 21, 2017

(86) PCT No.: PCT/KR2017/006528
§ 371 (c)(1),
(2) Date: Nov. 30, 2018

(87) PCT Pub. No.: WO2017/222301
PCT Pub. Date: Dec. 28, 2017

(65) Prior Publication Data
US 2019/0222862 A1    Jul. 18, 2019

(30) Foreign Application Priority Data

Jun. 21, 2016 (KR) .................. 10-2016-0077512
Feb. 28, 2017 (KR) .................. 10-2017-0026692

(51) Int. Cl.
*H04N 19/563* (2014.01)
*G06T 3/00* (2006.01)
(Continued)

(52) U.S. Cl.
CPC ........... *H04N 19/563* (2014.11); *G06T 3/005* (2013.01); *H04N 19/52* (2014.11); *H04N 19/55* (2014.11); *H04N 9/3185* (2013.01)

(58) Field of Classification Search
CPC ...... H04N 19/563; H04N 19/55; H04N 19/52; H04N 9/3185; H04N 19/597; G06T 3/005
See application file for complete search history.

(56) References Cited

U.S. PATENT DOCUMENTS

2003/0108099 A1    6/2003  Nagumo et al.
2006/0034374 A1*   2/2006  Park .................... G06T 7/20
                                               375/240.16
(Continued)

FOREIGN PATENT DOCUMENTS

KR     20060015225 A    2/2006
KR     20060050350 A    5/2006
(Continued)

OTHER PUBLICATIONS

International Search Report dated Sep. 27, 2017.

*Primary Examiner* — Marnie A Matt
(74) *Attorney, Agent, or Firm* — Dinsmore & Shohl LLP; Yongsok Choi, Esq.

(57) ABSTRACT

An encoding apparatus comprises: a network interface for receiving an image; a memory for storing a command for encoding the image; and a processor for encoding the image according to the command, wherein the processor performs padding to set pixel values of a padding area corresponding to one edge area of the image by referring to the other edge area of the image adjacent to the one edge area on a sphere on which the image is projected, seeks a motion vector by referring to the pixel values of the padding area and encodes the image by referring to the motion vector, wherein the image is a 360-degree image.

21 Claims, 17 Drawing Sheets

(51) Int. Cl.
*H04N 19/52* (2014.01)
*H04N 19/55* (2014.01)
*H04N 9/31* (2006.01)

(56) References Cited

U.S. PATENT DOCUMENTS

| | | | | |
|---|---|---|---|---|
| 2006/0034529 | A1* | 2/2006 | Park | H04N 19/563 |
| | | | | 382/236 |
| 2006/0034530 | A1* | 2/2006 | Park | G06T 9/004 |
| | | | | 382/236 |
| 2013/0083853 | A1* | 4/2013 | Coban | H04N 19/563 |
| | | | | 375/240.16 |
| 2015/0172544 | A1* | 6/2015 | Deng | G06T 9/001 |
| | | | | 348/36 |
| 2017/0214937 | A1* | 7/2017 | Lin | H04N 19/56 |
| 2017/0353737 | A1* | 12/2017 | Lin | H04N 19/563 |
| 2018/0359487 | A1* | 12/2018 | Bang | H04N 19/50 |

FOREIGN PATENT DOCUMENTS

| | | |
|---|---|---|
| KR | 20060050351 A | 5/2006 |
| KR | 20140074377 A | 6/2014 |

* cited by examiner

ENCODING APPARATUS AND METHOD, AND DECODING APPARATUS AND METHOD

CROSS-REFERENCE TO RELATED APPLICATIONS

This application is a National Stage of International Application PCT/KR2017/006528 filed on Jun. 21, 20174, which claims priority to Korean Patent Application No. 10-2017-0026692, filed on Feb. 28, 2017 and Korean Patent Application No. 10-2016-0077512, filed on Jun. 21, 2016, the entire contents of which are hereby incorporated by reference.

TECHNICAL FIELD

The present invention relates to encoding and decoding technologies and, more particularly, to an encoding apparatus and method, and a decoding apparatus and method for encoding and decoding 360-degree images.

BACKGROUND ART

A 360-degree image is an image format for recording the 360-degree real world scene by using a 360-degree camera or a plurality of cameras. Conceptually, a 360-degree image is formed as a spherical image. However, for the purpose of encoding, it is necessary to project a spherical image onto the corresponding planar form. The 360-degree image may be an image encoded by the Equirectangular projection format which converts a spherical image into a large rectangular image or the cube map projection format which maps the spherical image onto 6 faces of an unfolded cube.

The 360-degree image exhibits different characteristics from an ordinary image; however, since the 360-degree image is encoded by a method devised for encoding the ordinary image, an encoding method more specific to the 360-degree image is needed.

SUMMARY

Technical Problem

An object of the present invention is to provide efficient encoding and decoding apparatus and methods for encoding and decoding 360-degree images, through a process for predicting motion vectors by applying a padding operation suitable for 360-degree images.

Technical Solution

According to one aspect of the present invention, an encoding apparatus comprises a memory configured to store a command for encoding an image; and a processor configured to encode the image according to the command, wherein the processor is configured to perform padding to set pixel values of a padding area corresponding to one edge area of the image by referring to the other edge area of the image adjacent to the one edge area on a sphere on which the image is projected, to predict a motion vector by referring to the pixel values of the padding area, and to encode the image by referring to the motion vector, and wherein the image is a 360-degree image.

According to another aspect of the present invention, a method for encoding an image by an encoding apparatus comprises performing padding to set pixel values of a padding area corresponding to one edge area of the image by referring to other edge area of the image adjacent to the one edge area on a sphere on which the image is projected; predicting a motion vector by referring to the pixel values of the padding area; and encoding the image by referring to the motion vector, wherein the image is a 360-degree image.

According to yet another aspect of the present invention, a decoding apparatus comprises a memory configured to store a command for decoding encoded data; and a processor configured to decode the encoded data according to the command, wherein the processor is configured to perform padding to set pixel values of a padding area corresponding to one edge area of a reference frame corresponding to the encoded data by referring to other edge area of the image adjacent to the one edge area on a sphere on which the image is projected, to extract a motion vector from encoded data, and to reconstruct a 360-degree image by performing decoding of the encoded data by referring to the motion vector.

According to still another aspect of the present invention, a method for decoding encoded data by a decoding apparatus comprises performing padding to set pixel values of a padding area corresponding to one edge area of a reference frame corresponding to the encoded data by referring to other edge area of the image adjacent to the one edge area on a sphere on which the image is projected; extracting a motion vector from the encoded data; and reconstructing a 360-degree image by performing decoding of the encoded data by referring to the motion vector.

Advantageous Effects

According to the present invention, through padding appropriate for a 360-degree image, motion vector may be predicted accurately, and thereby compression performance for 360-degree images may be improved.

MODE FOR INVENTION

Since the present invention may be modified in various ways and may provide various embodiments, specific embodiments will be depicted in the appended drawings and described in detail with reference to the drawings. However, it should be understood that the specific embodiments are not intended to restrict the gist of the present invention to the specific embodiments; rather, it should be understood that the specific embodiments include all of the modifications, equivalents, or substitutes described by the technical principles and belonging to the technical scope of the present invention.

In what follows, a 360-degree image may refer to an image recording an area covering the 360 degree range with respect to two axes (horizontal and vertical axes) such as an Equirectangular projection (ERP) format image or a cube map projection (CMP) format image; or an image recording an area covering the 360 degree range with respect to a single axis such as a panorama image.

Figure 1:
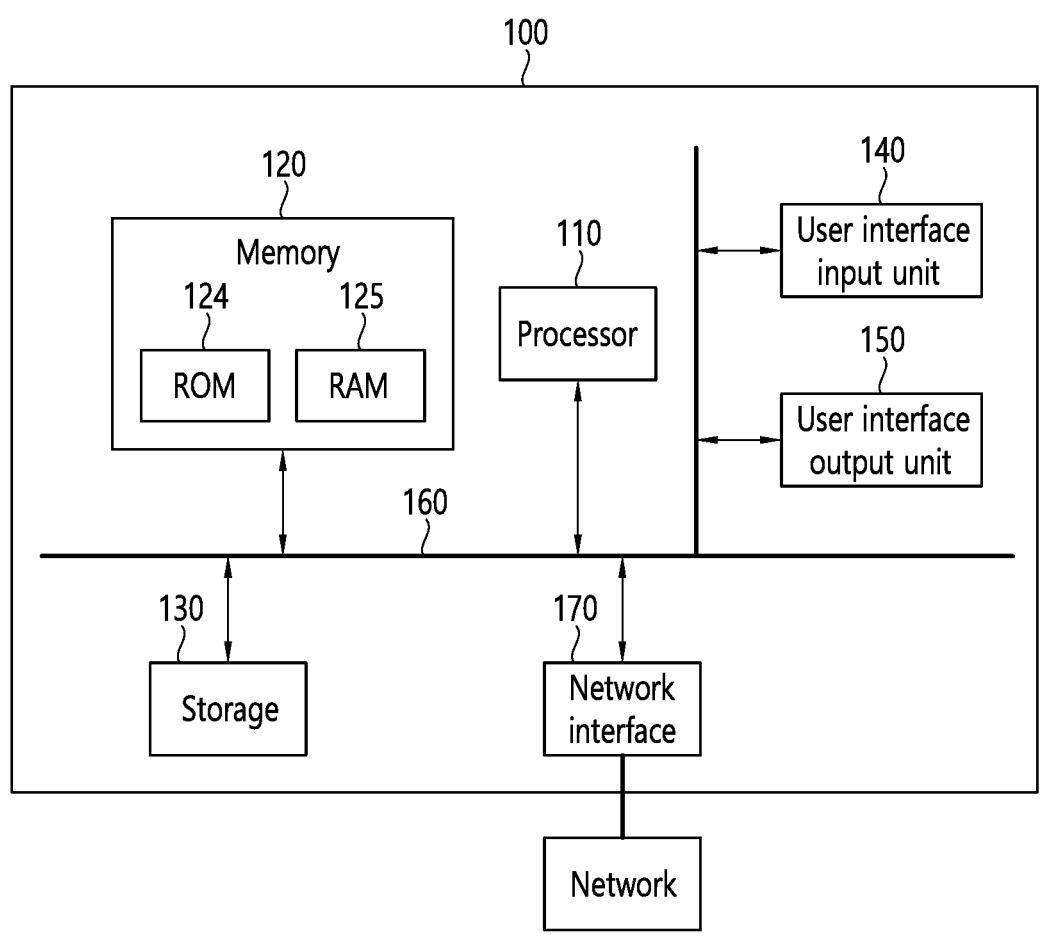
FIG. 1 illustrates an encoding apparatus according to one embodiment of the present invention.

FIG. 1 illustrates an encoding apparatus according to one embodiment of the present invention.

Referring to FIG. 1, an encoding apparatus according to one embodiment of the present invention may comprise at least one or more elements of a processor 110, a memory 120, a storage 130, a user interface input unit 140, and a user interface output unit 150, where the at least one or more elements may communicate with each other through a bus 160. Also, the encoding apparatus may further comprise a network interface 170 for connecting to an external device through a network or a connection port. The processor 110 may be a CPU or a semiconductor device which performs a command stored in the memory 120 and/or the storage 130. The memory 120 and the storage 130 may comprise various types of volatile/non-volatile storage medium. For example, the memory may comprise a ROM 124 and a RAM 125.

In other words, an encoding apparatus according to one embodiment may be implemented in the form of a computer system and performs a function of playing an image according to a stored command.

Figure 2:
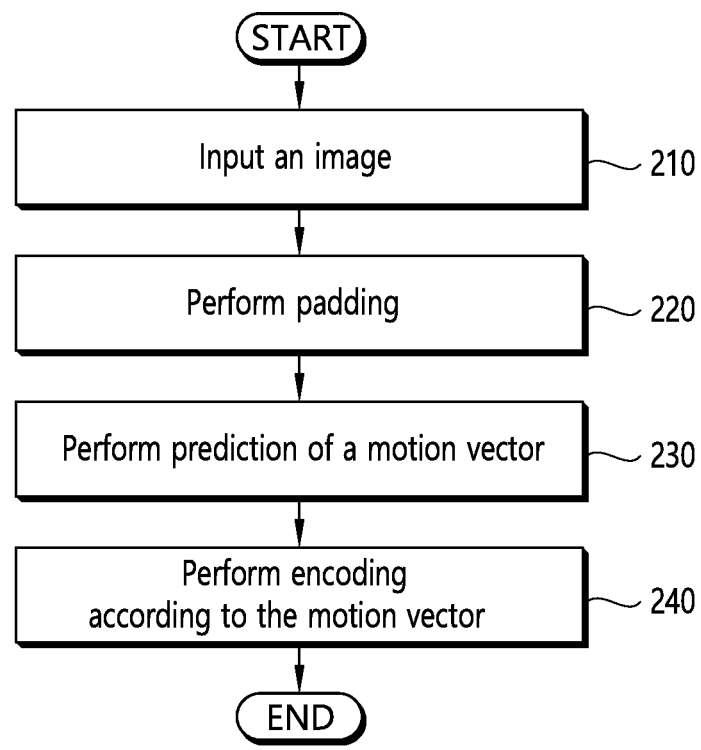
FIG. 2 is a flow diagram illustrating a process for encoding a 360-degree image by an encoding apparatus according to one embodiment of the present invention.
Figure 3:
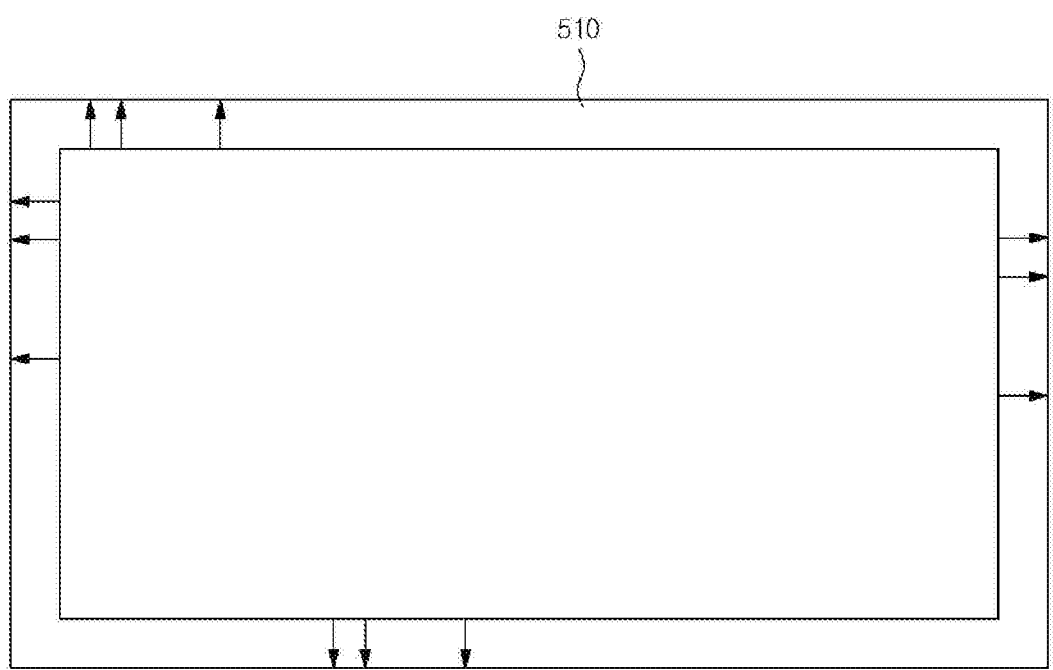
FIG. 3 illustrates a padding area to which an encoding apparatus according to one embodiment of the present invention applies padding.

FIG. 2 is a flow diagram illustrating a process for encoding a 360-degree image by an encoding apparatus according to one embodiment of the present invention, and FIG. 3 illustrates a padding area to which an encoding apparatus according to one embodiment of the present invention applies padding. Each individual step described below corresponds to a process performed through each functional unit constituting the encoding apparatus; for the sake of simplicity and clarity in describing the present invention, however, the subject of each step will be collectively referred to as the encoding apparatus.

Referring to FIG. 2, at the step 210, the encoding apparatus receives a 360-degree input image from an external device such as a camera or a storage medium. For example, the encoding apparatus may receive an ERP format image which has been converted from an image projected on a sphere to a planar rectangular image or a CMP format image which has been converted from an image projected on a sphere to the form of a cube and subsequently converted to the unfolded form of the cube.

At the step 220, the encoding apparatus perform padding on the image. At this time, padding is a process to set each pixel value of a padding area (510 of FIG. 3) which is an edge area outside an image to predict motion vector of a block within a designated search range. In what follows, a padding process performed by the encoding apparatus will be described in detail.

At the step 230, the encoding apparatus predicts a motion vector for each block of the image.

At the step 240, the encoding apparatus generates encoded data by performing encoding of a target block according to a predicted motion vector. At this time, the process for predicting a motion vector and the encoding process may employ well-known methods such as ones specified in the related standards. Therefore, encoded data may include a motion vector for each block.

Figure 4:
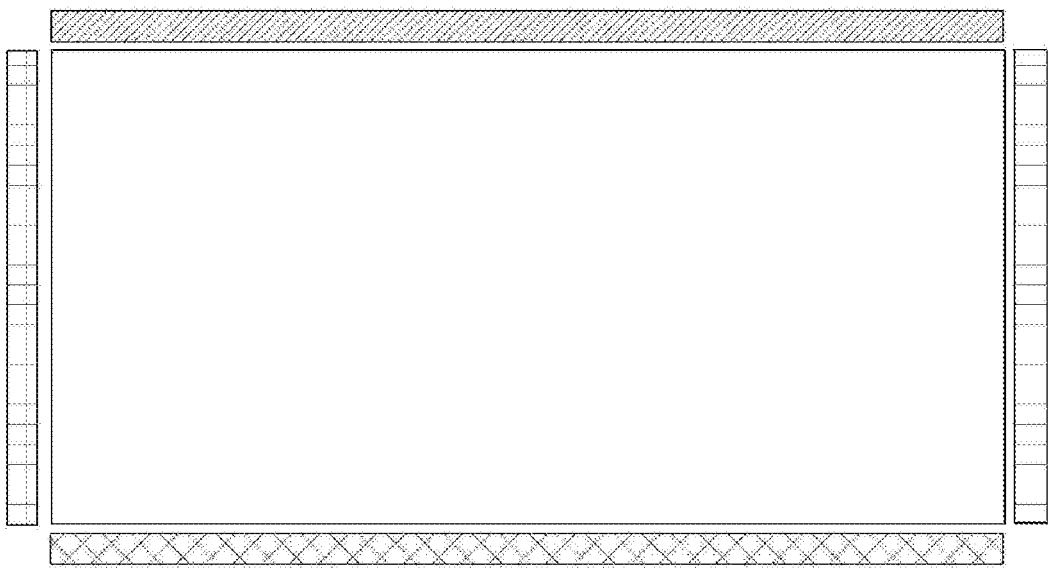
FIG. 4 illustrates portions of edge areas of an Equirectangular projection format image input to an encoding apparatus according to one embodiment of the present invention, which are adjacent to each other in an image projected on a sphere.

FIG. 4 illustrates portions of edge areas of an ERP format image or a panorama image input to an encoding apparatus according to one embodiment of the present invention, which are adjacent to each other in an image projected on a sphere.

Referring to FIG. 4, the area corresponding to the leftmost edge of an ERP format image or a panorama image comes into contact with the area corresponding to the rightmost edge of the image when the image is projected on a sphere. Also, the pixels in the area corresponding to the topmost edge of the ERP format image or the panorama image come into contact with each other on the sphere, and the pixels in the area corresponding to the bottommost edge of the image come into contact with each other on the sphere. As the leftmost edge of the image comes into contact with the rightmost edge of the image on the sphere, the encoding apparatus performs padding on the padding area adjacent to the leftmost edge by using the pixel values of the rightmost edge. In what follows, an area which is not adjacent to a specific area (not located within a predetermined distance) in an image but brought into vicinity of the specific area (located within a predetermined distance) when the corresponding image is mapped onto a sphere will be called an adjacent area.

Therefore, when pixels in a padding area corresponding to one side of the ERP format image or the panorama image are padded with pixel values of an adjacent area of the image on the sphere, accuracy of a motion vector prediction through the encoding process may be improved, and the capacity of an encoded image may be reduced as the encoding apparatus encodes the image through the accurately predicted motion vector.

In what follows, a padding process for an ERP format image or a panorama image will be described in detail with reference to FIGS. 5 to 12. At this time, among the pixels indicated by circles in FIGS. 5 to 12 below, those pixels of the same color and number are assumed to have the same pixel values.

Figure 5:
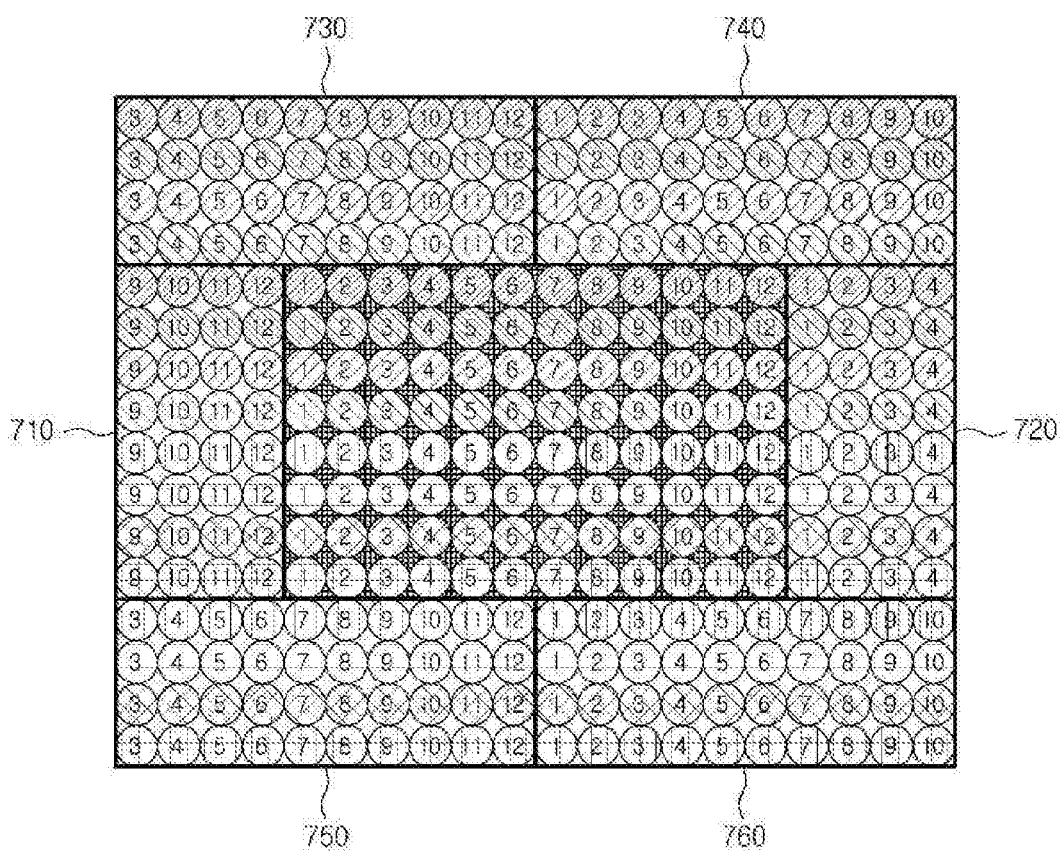
FIG. 5 illustrates a first example of a padding method applied to an Equirectangular projection format image by an encoding apparatus according to one embodiment of the present invention.
Figure 6:
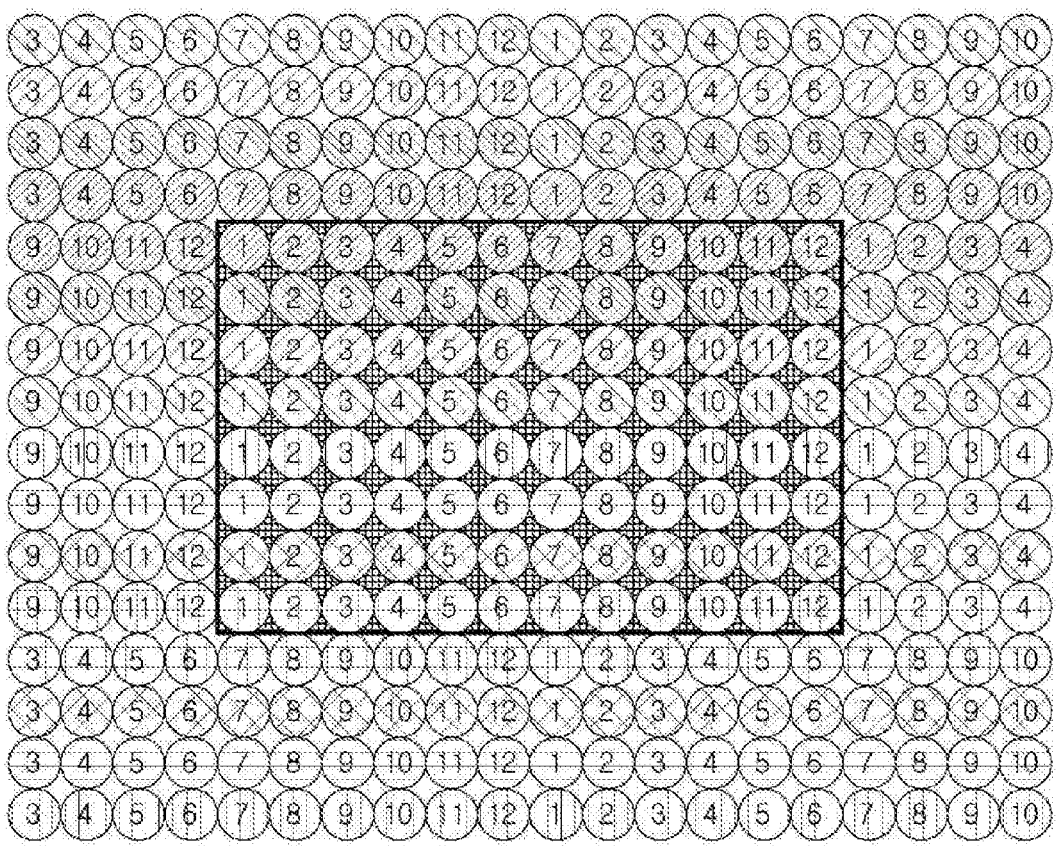
FIG. 6 illustrates an example where the order of vertical arrangement of part of pixels is changed in the first example of a padding method applied to an Equirectangular projection format image by an encoding apparatus according to one embodiment of the present invention.

FIG. 5 illustrates a first example of a padding method applied to an ERP format image by an encoding apparatus according to one embodiment of the present invention, and FIG. 6 illustrates an example where the order of vertical arrangement of part of pixels is changed in the first example of a padding method applied to an ERP format image by an encoding apparatus according to one embodiment of the present invention.

Referring to FIG. 5, the encoding apparatus sets the pixel values of the left padding area 710 of the image to the pixel values of a region within the number of columns of the left padding area 710 from the rightmost column of the image.

Also, the encoding apparatus sets the pixel values of the right padding area 720 of the image to the pixel values of a region within the number of columns of the right padding area 720 from the leftmost column of the image.

Therefore, the encoding apparatus may perform padding so that the pixels originally lying in contact with each other on a sphere are made to come into contact with each other.

The encoding apparatus sets the pixel values of a first upper padding area 730 to the values of the pixels corresponding to the region which extends from the rightmost column left to the column corresponding to the number of columns of the first upper padding area 730 among the pixels corresponding to the region which extends from the topmost row down to the row corresponding to the number of rows of the first upper padding area 730.

The encoding apparatus sets the pixel values of a second upper padding area 740 to the values of the pixels corresponding to the region which extends from the leftmost column right to the column corresponding to the number of columns of the second upper padding area 740 among the pixels corresponding to the region which extends from the topmost row down to the row corresponding to the number of rows of the second upper padding area 740.

At this time, the first upper padding area 730 may be a region lying in the left side among the regions divided from a padding area located in the upper side of the image with reference to a vertical line passing through the center point of the image, and the second upper padding area 740 may be a region lying in the right side among the regions divided from a padding area located in the upper side of the image with reference to the vertical line passing through the center point of the image.

The encoding apparatus sets the pixel values of a first lower padding area 750 to the values of the pixels corresponding to the region which extends from the rightmost column left to the column corresponding to the number of columns of the first lower padding area 750 among the pixels corresponding to the region which extends from the bottommost row up to the row corresponding to the number of rows of the first lower padding area 750.

The encoding apparatus sets the pixel values of a second lower padding area 760 to the values of the pixels corresponding to the region which extends from the leftmost column right to the column corresponding to the number of columns of the second lower padding area 760 among the pixels corresponding to the region which extends from the bottommost row up to the row corresponding to the number of rows of the second lower padding area 760.

At this time, the first lower padding area 750 may be a region lying in the left side among the regions divided from a padding area located in the lower side of the image with reference to a vertical line passing through the center point of the image, and the second lower padding area 760 may be a region lying in the right side among the regions divided from a padding area located in the lower side of the image with reference to the vertical line passing through the center point of the image.

At this time, as shown in FIG. 6, depending on the design method, the encoding apparatus may make the order of vertical arrangement of pixels belonging to the first upper padding area 730, second upper padding area 740, first lower padding area 750, and second lower padding area 760 reverse to the order of the image.

Figure 7:
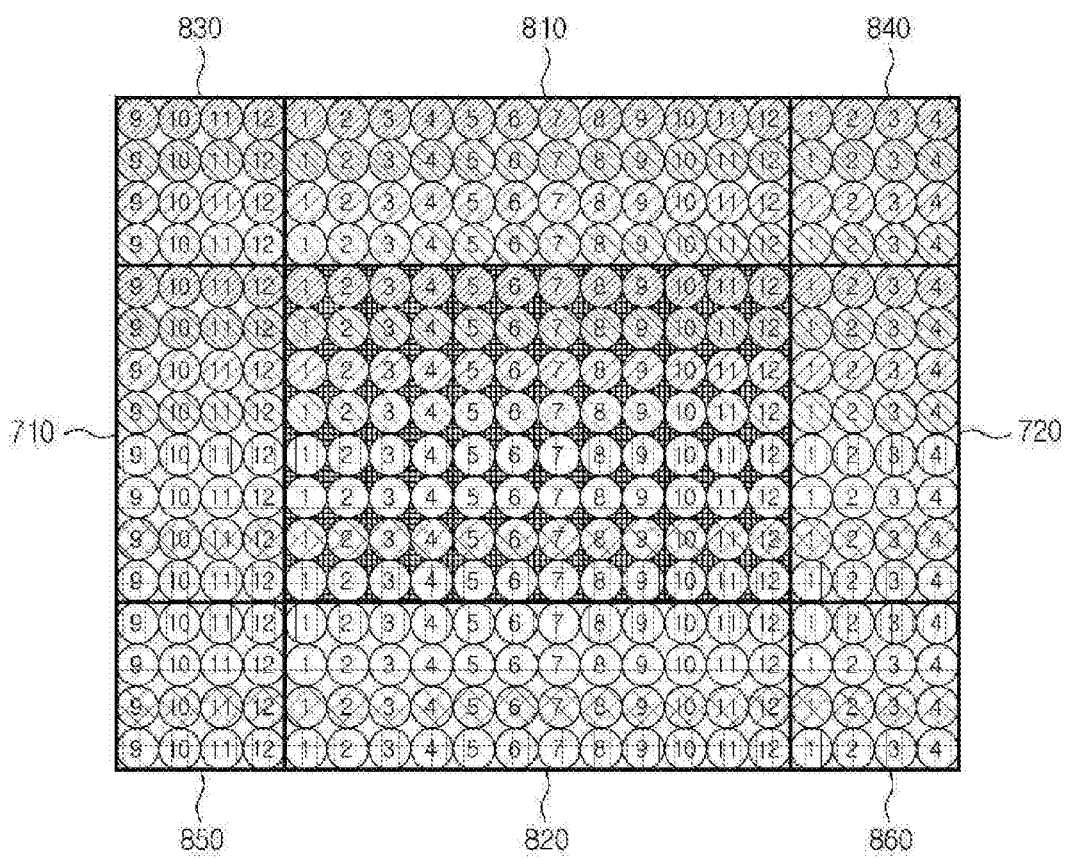
FIG. 7 illustrates a second example of a padding method applied to an Equirectangular projection format image by an encoding apparatus according to one embodiment of the present invention.
Figure 8:
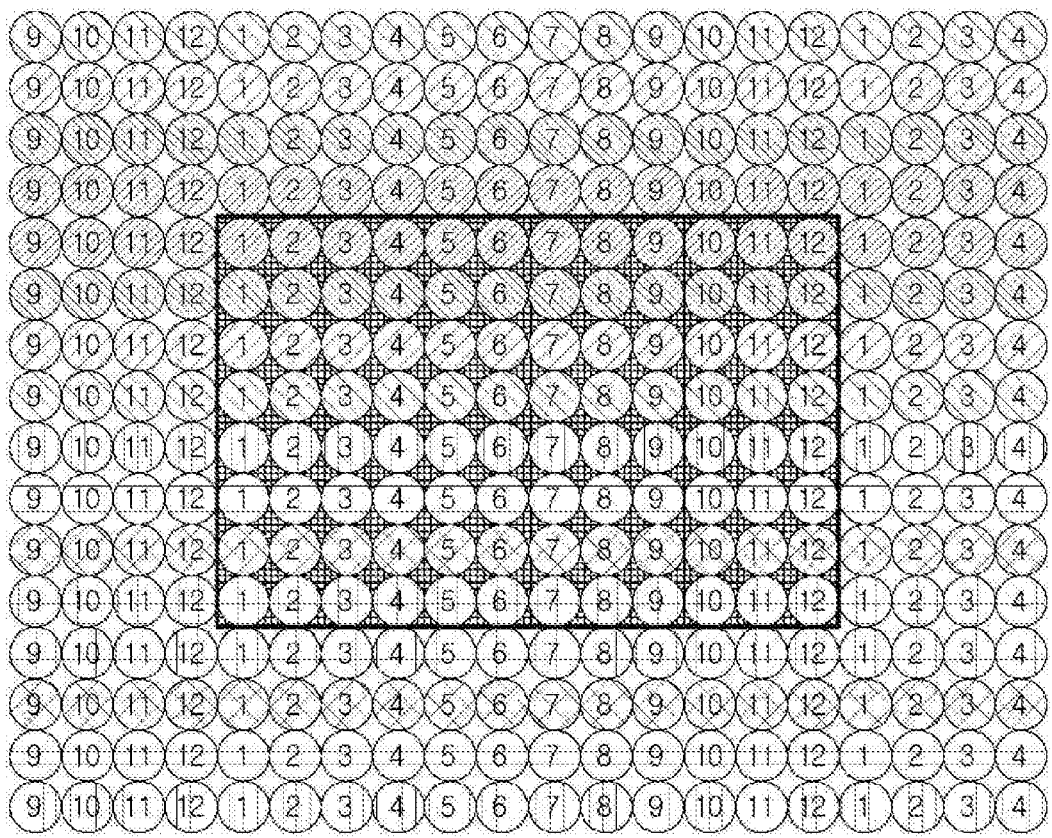
FIG. 8 illustrates an example where the order of vertical arrangement of part of pixels is changed in the second example of a padding method applied to an Equirectangular projection format image by an encoding apparatus according to one embodiment of the present invention.

FIG. 7 illustrates a second example of a padding method applied to an ERP format image by an encoding apparatus according to one embodiment of the present invention, and FIG. 8 illustrates an example where the order of vertical arrangement of part of pixels is changed in the second example of a padding method applied to an ERP format image by an encoding apparatus according to one embodiment of the present invention.

Referring to FIG. 7, the encoding apparatus sets the pixel values of the left padding area 710 of the image to the pixel values corresponding to a region within the number of columns of the left padding area 710 from the rightmost column of the image.

Also, the encoding apparatus sets the pixel values of the right padding area 720 of the image to the pixel values corresponding to a region within the number of columns of the right padding area 720 from the leftmost column of the image.

Therefore, the encoding apparatus may perform padding so that the pixels originally lying in contact with each other on a sphere are made to come into contact with each other.

The encoding apparatus sets the pixel values of a central upper padding area 810 to the values of the pixels corresponding to the region which extends from the topmost row down to the row corresponding to the number of rows of the central upper padding area 810. At this time, the central upper padding area 810 refers to the area comprising pixels located on a virtual vertical line which passes through each individual pixel belonging to the image among the pixels located in the upper side of the image.

The encoding apparatus sets the pixel values of a central lower padding area 820 to the values of the pixels corresponding to the region which extends from the bottommost row up to the row corresponding to the number of rows of the central lower padding area 820. At this time, the central lower padding area 820 refers to the area comprising pixels located on a virtual vertical line which passes through each individual pixel belonging to the image among the pixels located in the lower side of the image.

The encoding apparatus sets the pixel values of the upper left padding area 830 to the pixel values of the region starting from the pixel at the upper rightmost part of the image and amounting to the number of rows and columns of an upper left padding area 830. At this time the upper left padding area 830 refers to the padding area located in the upper left side of the image among the remaining padding areas except for the central upper padding area 810, central lower padding area 820, left padding area 710, and right padding area 720.

The encoding apparatus sets the pixel values of the upper right padding area 840 to the pixel values of the region starting from the pixel at the upper leftmost part of the image and amounting to the number of rows and columns of an upper right padding area 840. At this time, the upper right padding area 840 refers to the padding area located in the upper right side of the image among the remaining padding areas except for the central upper padding area 810, central lower padding area 820, left padding area 710, and right padding area 720.

The encoding apparatus sets the pixel values of the lower left padding area 850 to the pixel values of the region starting from the pixel at the lower rightmost part of the image and amounting to the number of rows and columns of a lower left padding area 850. At this time, the lower left padding area 850 refers to the padding area located in the lower left side of the image among the remaining padding areas except for the central upper padding area 810, central lower padding area 820, left padding area 710, and right padding area 720.

The encoding apparatus sets the pixel values of the lower right padding area 860 to the pixel values of the region starting from the pixel at the lower leftmost part of the image and amounting to the number of rows and columns of a lower right padding area 860. At this time, the lower right padding area 860 refers to the padding area located in the lower right side of the image among the remaining padding areas except for the central upper padding area 810, central lower padding area 820, left padding area 710, and right padding area 720.

At this time, as shown in FIG. 8, depending on the design method, the encoding apparatus may make the order of vertical arrangement of pixels belonging to the remaining padding area except for the left padding area 710 and the right padding area 720 reverse to the order of the image.

Figure 9:
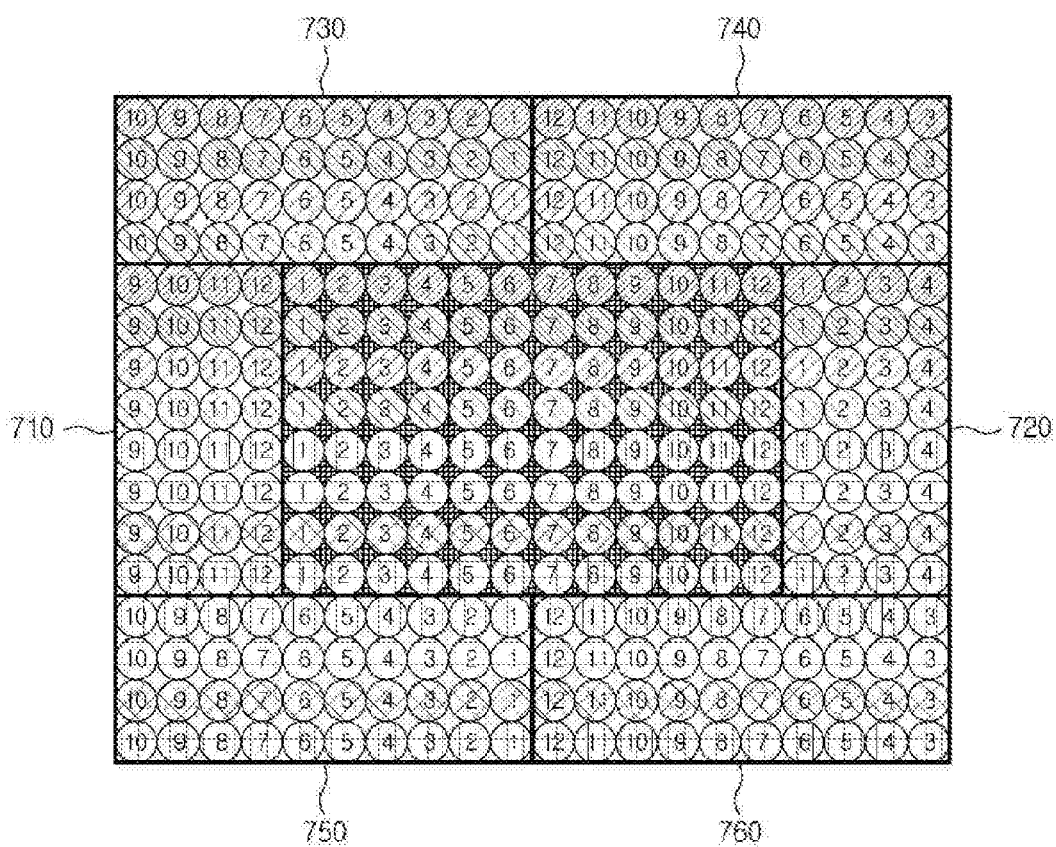
FIG. 9 illustrates a third example of a padding method applied to an Equirectangular projection format image by an encoding apparatus according to one embodiment of the present invention.
Figure 10:
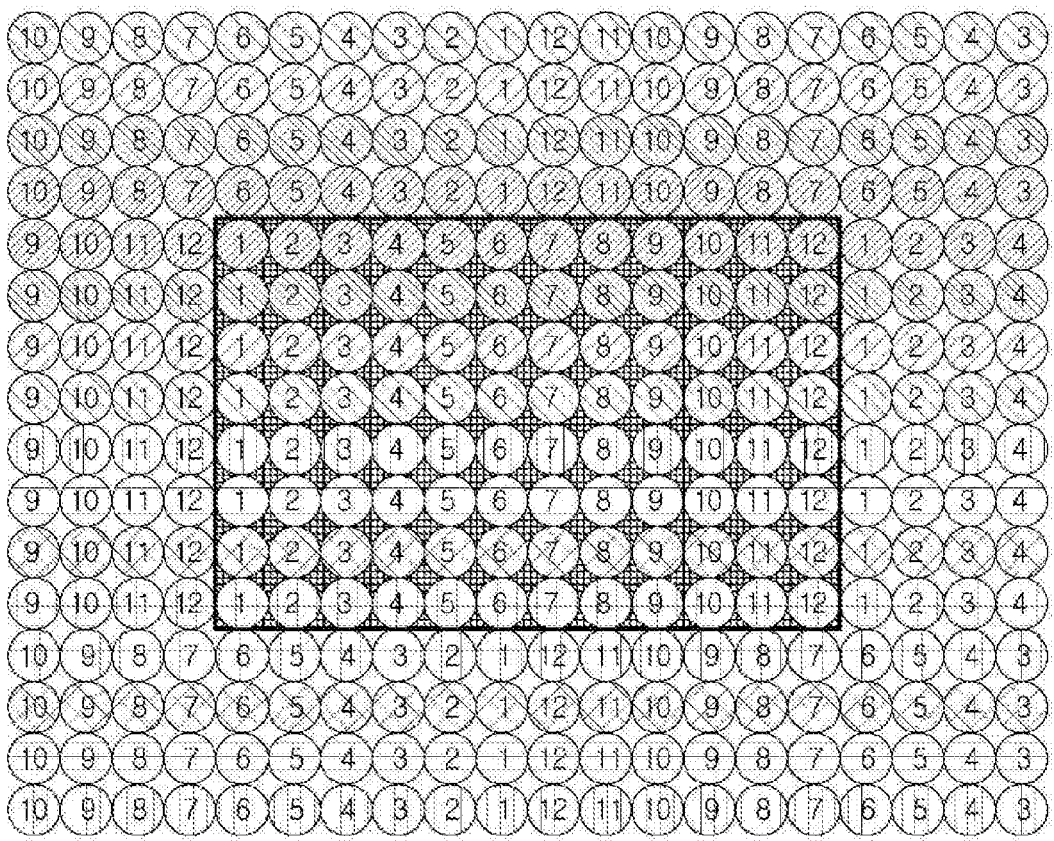
FIG. 10 illustrates an example where the order of vertical arrangement of part of pixels is changed in the third example of a padding method applied to an Equirectangular projection format image by an encoding apparatus according to one embodiment of the present invention.

FIG. 9 illustrates a third example of a padding method applied to an ERP format image by an encoding apparatus according to one embodiment of the present invention, and FIG. 10 illustrates an example where the order of vertical arrangement of part of pixels is changed in the third example of a padding method applied to an ERP format image by an encoding apparatus according to one embodiment of the present invention.

Referring to FIG. 9, the encoding apparatus sets the pixel values of the left padding area 710 of the image to the pixel values corresponding to a region within the number of columns of the left padding area 710 from the rightmost column of the image.

Also, the encoding apparatus sets the pixel values of the right padding area 720 of the image to the pixel values corresponding to a region within the number of columns of the right padding area 720 from the leftmost column of the image.

Therefore, the encoding apparatus may perform padding so that the pixels originally lying in contact with each other on a sphere are made to come into contact with each other.

The encoding apparatus reverses the order of horizontal arrangement of the pixels corresponding to the region which extends from the leftmost column right to the column corresponding to the number of columns of the first upper padding area 730 among the pixels corresponding to the region which extends from the topmost row down to the row corresponding to the number of rows of the first upper padding area 730 and sets the values of pixels arranged in the reverse order to the pixel values of the first upper padding area 730.

The encoding apparatus reverses the order of horizontal arrangement of the pixels corresponding to the region which extends from the rightmost column left to the column corresponding to the number of columns of the second upper padding area 740 among the pixels corresponding to the region which extends from the topmost row down to the row corresponding to the number of rows of the second upper padding area 740 and sets the values of pixels arranged in the reverse order to the pixel values of the second upper padding area 740.

At this time, the first upper padding area 730 may refer to the region lying in the left side among the regions divided from a padding area located in the upper side of the image with reference to a vertical line passing through the center point of the image, and the second upper padding area 740 may refer to the region lying in the right side among the regions divided from a padding area located in the upper side of the image with reference to a vertical line passing through the center point of the image.

The encoding apparatus reverses the order of horizontal arrangement of the pixels corresponding to the region which extends from the leftmost column right to the column corresponding to the number of columns of the first lower padding area 750 among the pixels corresponding to the region which extends from the bottommost row up to the row corresponding to the number of rows of the first lower padding area 750 and sets the values of pixels arranged in the reverse order to the pixel values of the first lower padding area 750.

The encoding apparatus reverses the order of horizontal arrangement of the pixels corresponding to the region which extends from the rightmost column left to the column corresponding to the number of columns of the second lower padding area 760 among the pixels corresponding to the region which extends from the bottommost row up to the row corresponding to the number of rows of the second lower padding area 760 and sets the values of pixels arranged in the reverse order to the pixel values of the second lower padding area 760.

At this time, the first upper padding area 750 may refer to the region lying in the left side among the regions divided from a padding area located in the upper side of the image with reference to a vertical line passing through the center point of the image, and the second upper padding area 760 may refer to the region lying in the right side among the regions divided from a padding area located in the upper side of the image with reference to a vertical line passing through the center point of the image.

At this time, as shown in FIG. 10, depending on the design method, the encoding apparatus may make the order of vertical arrangement of pixels belonging to the first upper padding area 730, second upper padding area 740, first lower padding area 750, and second lower padding area 760 reverse to the order of the image.

Figure 11:
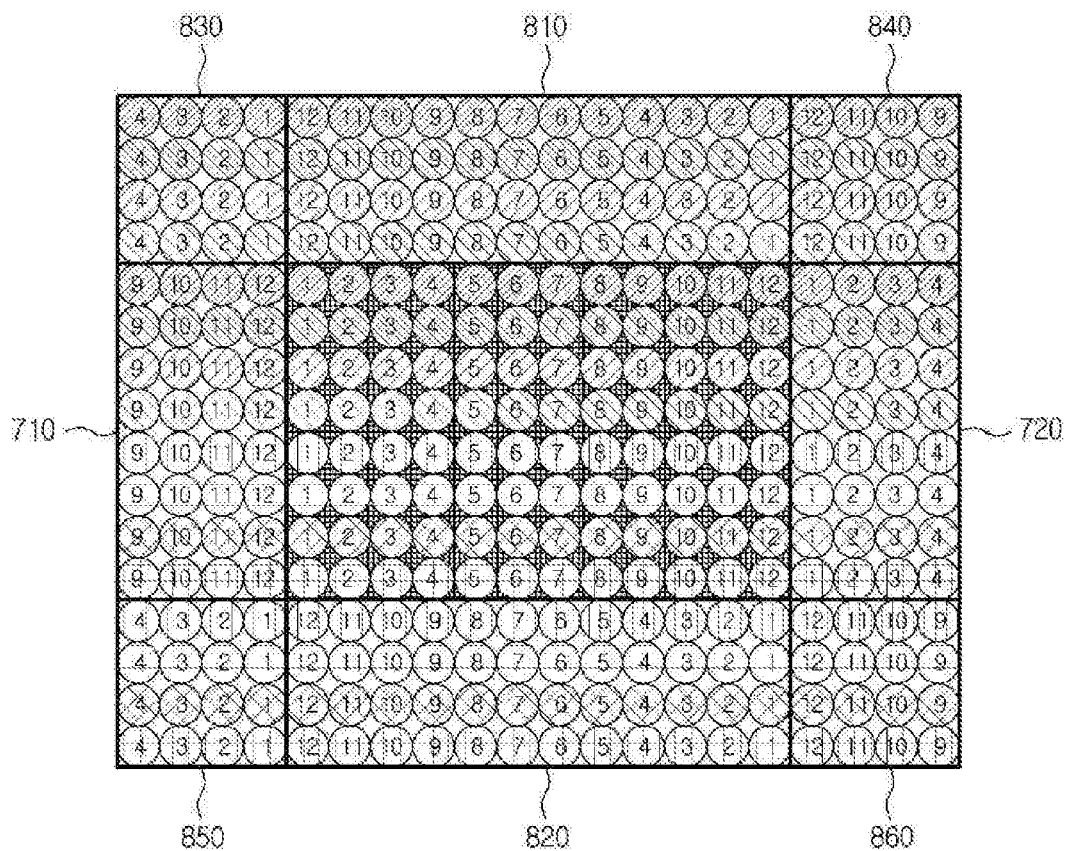
FIG. 11 illustrates a fourth example of a padding method applied to an Equirectangular projection format image by an encoding apparatus according to one embodiment of the present invention.
Figure 12:
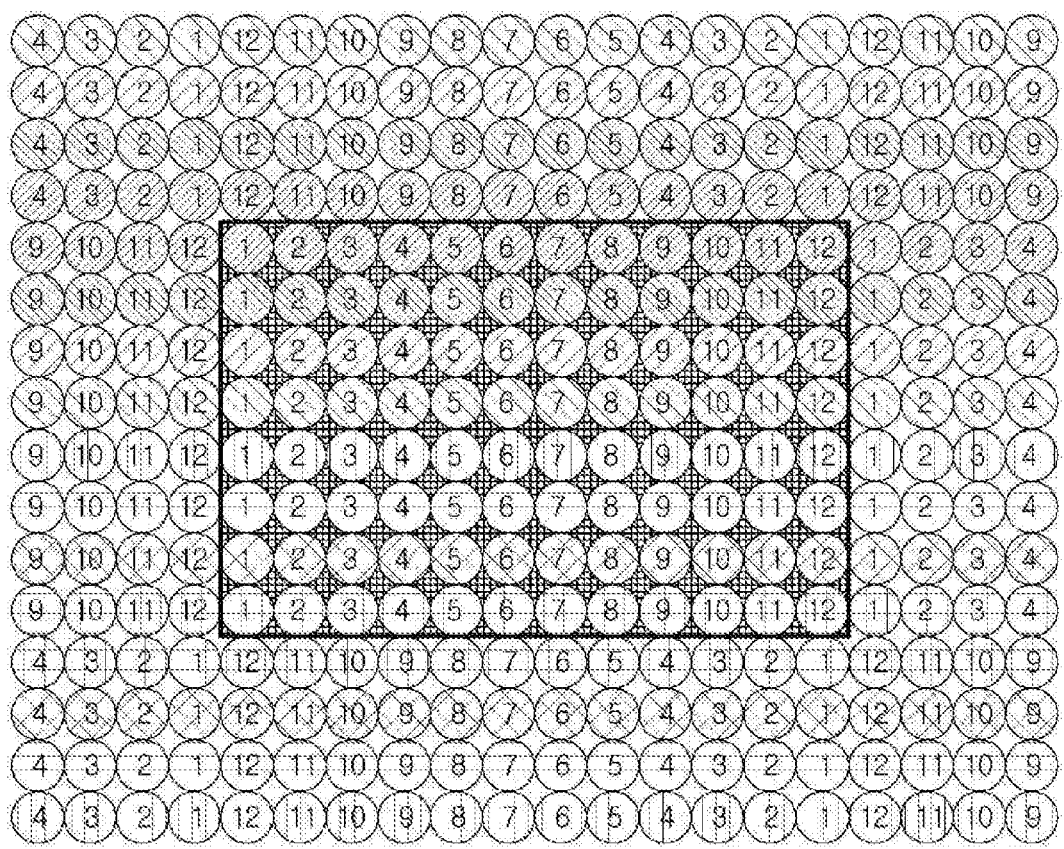
FIG. 12 illustrates an example where the order of vertical arrangement of part of pixels is changed in the fourth example of a padding method applied to an Equirectangular projection format image by an encoding apparatus according to one embodiment of the present invention.

FIG. 11 illustrates a fourth example of a padding method applied to an ERP format image by an encoding apparatus according to one embodiment of the present invention, and FIG. 12 illustrates an example where the order of vertical arrangement of part of pixels is changed in the fourth example of a padding method applied to an ERP format image by an encoding apparatus according to one embodiment of the present invention.

The encoding apparatus sets the pixel values of the left padding area 710 of the image to the pixel values corresponding to a region within the number of columns of the left padding area 710 from the rightmost column of the image.

Also, the encoding apparatus sets the pixel values of the right padding area 720 of the image to the pixel values corresponding to a region within the number of columns of the right padding area 720 from the leftmost column of the image.

Therefore, the encoding apparatus may perform padding so that the pixels originally lying in contact with each other on a sphere are made to come into contact with each other.

The encoding apparatus reverses the order of horizontal arrangement of the pixels corresponding to the region which extends from the topmost row down to the row corresponding to the number of rows of the central upper padding area 810 and sets the values of pixels arranged in the reverse order to the pixel values of the central upper padding area 810.

The encoding apparatus reverses the order of horizontal arrangement of the pixels corresponding to the region which extends from the bottommost row up to the row corresponding to the number of rows of the central lower padding area 820 and sets the values of pixels arranged in the reverse order to the pixel values of the central lower padding area 820.

The encoding apparatus reverses the order of horizontal arrangement of the pixels corresponding to the region which extends from the pixel at the upper leftmost position to the pixel at the position corresponding to the number of rows and the number of columns of the upper left padding area 830 and sets the values of pixels arranged in the reverse order to the pixel values of the upper left padding area 830.

The encoding apparatus reverses the order of horizontal arrangement of the pixels corresponding to the region which extends from the pixel at the upper rightmost position to the pixel at the position corresponding to the number of rows and the number of columns of the upper right padding area 840 and sets the values of pixels arranged in the reverse order to the pixel values of the upper right padding area 840.

The encoding apparatus reverses the order of horizontal arrangement of the pixels corresponding to the region which extends from the pixel at the lower leftmost position to the pixel at the position corresponding to the number of rows and the number of columns of the lower left padding area 850 and sets the values of pixels arranged in the reverse order to the pixel values of the lower left padding area 850.

The encoding apparatus reverses the order of horizontal arrangement of the pixels corresponding to the region which extends from the pixel at the lower rightmost position to the pixel at the position corresponding to the number of rows and the number of columns of the lower right padding area 860 and sets the values of pixels arranged in the reverse order to the pixel values of the lower right padding area 860.

At this time, as shown in FIG. 12, depending on the design method, the encoding apparatus may make the order of vertical arrangement of pixels belonging to the remaining padding area except for the left padding area 710 and the right padding area 720 reverse to the order of the image.

Up to this point, a padding process for an ERP format image or a panorama image has been described in detail.

In what follows, a padding process to be used for a CMP format image will be described in detail with reference to FIGS. 13 to 16.

Figure 13:
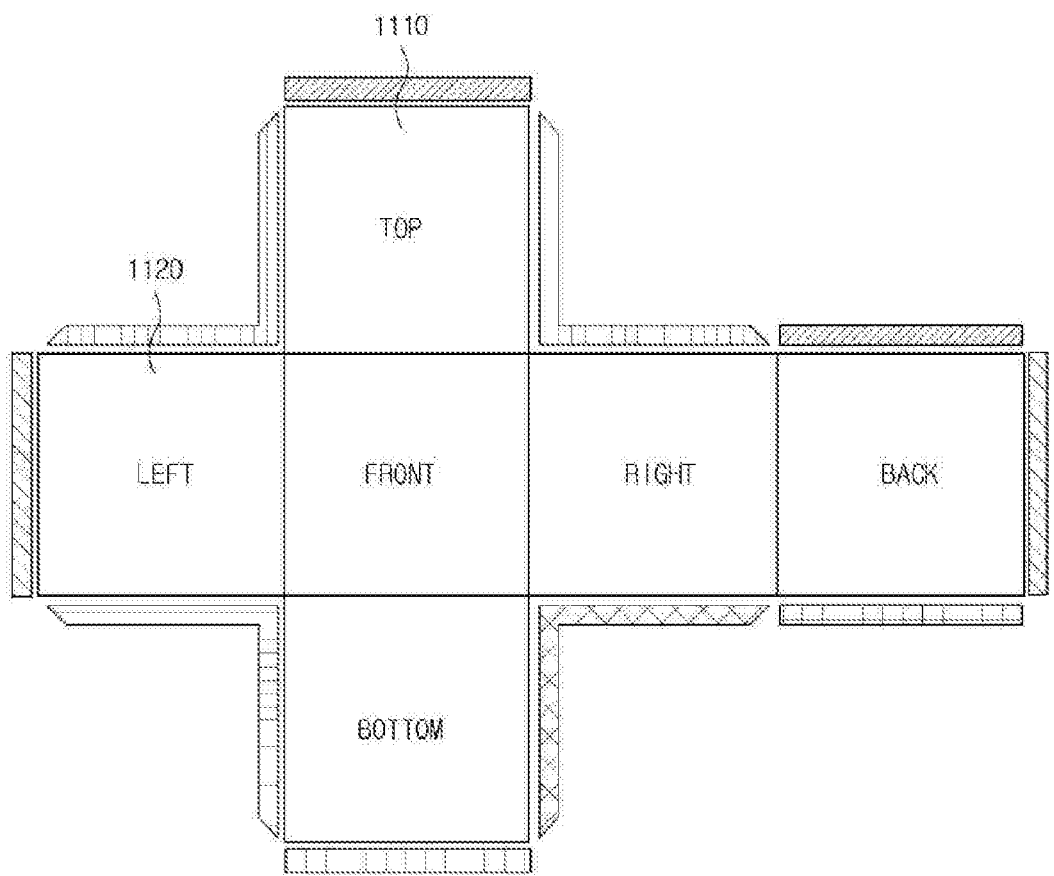
FIG. 13 illustrates portions of edge areas of a cube map projection format image input to an encoding apparatus according to one embodiment of the present invention, which are adjacent to each other in an image projected on a sphere.

FIG. 13 illustrates portions of edge areas of a CMP format image input to an encoding apparatus according to one embodiment of the present invention, which are adjacent to each other in an image projected on a sphere.

Referring to FIG. 13, a CMP format image comprises 6 regions forming the 6 faces of the cube, and each edge area adjoins other edge area of the cube each surface of which is formed by the corresponding face. When a CMP format image is constructed in the form of a cube, the encoding apparatus performs padding by using the property that two edge areas marked by the same hatch pattern, as shown in FIG. 13, are adjacent to each other on an image projected on a sphere.

For example, the encoding apparatus may set the pixel values of the left padding area of the first face 1110 to the pixel values of the upper edge area of the second face 1120, where the left edge area of a first face 1110 is adjacent to the upper edge area of a second face 1120. Also, the encoding apparatus may set the pixel values of the left padding area of the first face 1110 to the pixel values of the upper edge area of the second face 1120.

In other words, the encoding apparatus may perform padding for each face and when a padding area has to be referenced for encoding of a block on a specific face, may refer to the pixel value padded in accordance to the corresponding face.

In what follows, a padding process for a CMP format image will be described in detail with reference to FIGS. 14 to 16.

Figure 14:
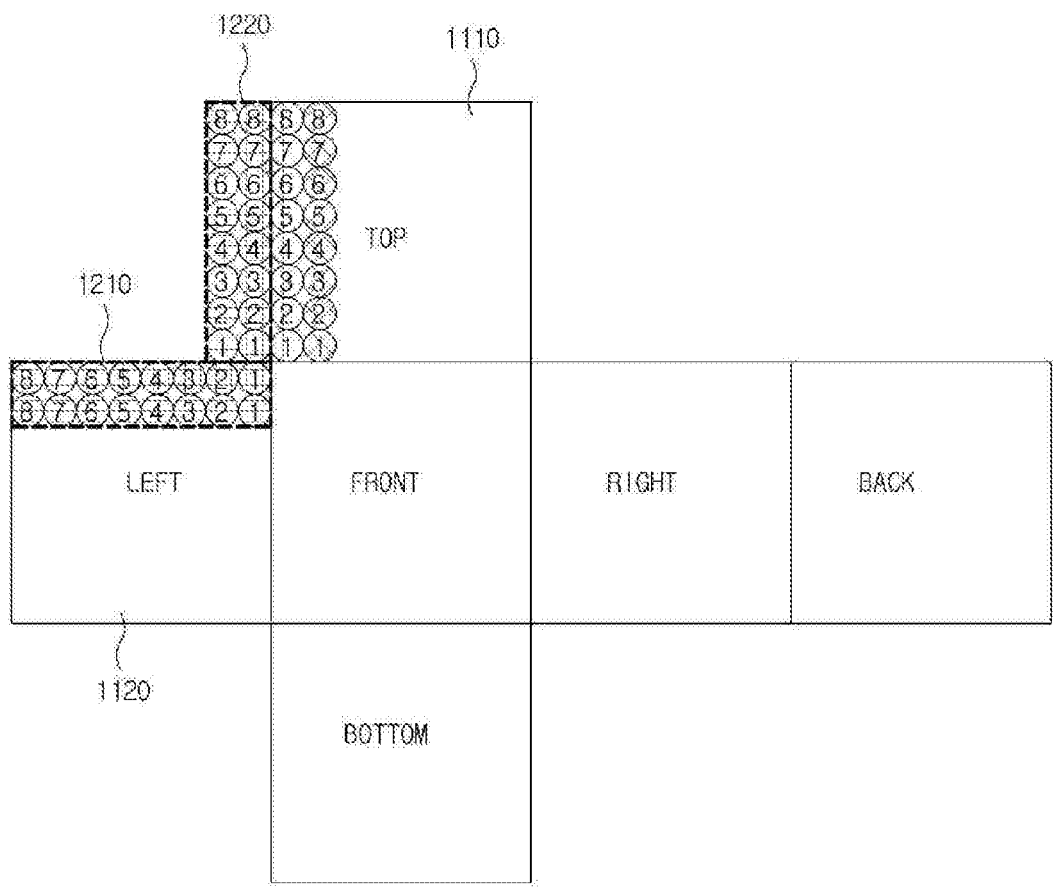
FIG. 14 illustrates an example where an encoding apparatus according to one embodiment of the present invention applies padding to one face of a cube map projection format image.
Figure 15:
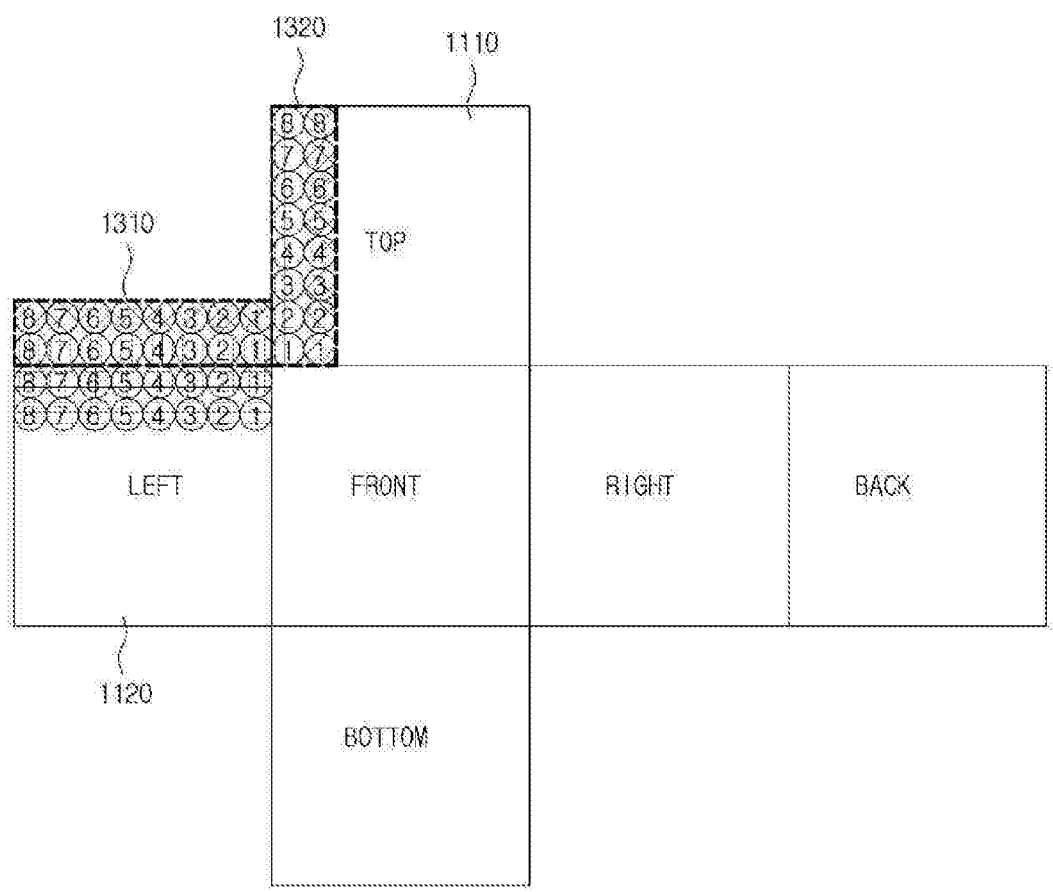
FIG. 15 illustrates an example where an encoding apparatus according to one embodiment of the present invention applies padding to other face of a cube map projection format image.

FIG. 14 illustrates an example where an encoding apparatus according to one embodiment of the present invention applies padding to one face of a CMP format image, and FIG. 15 illustrates an example where an encoding apparatus according to one embodiment of the present invention applies padding to other face of a CMP format image.

Referring to FIG. 14, the encoding apparatus may set the pixel values of the left padding area 1220 of the first face 1110 according to the pixel values of the upper edge area 1210 of the second face 1120.

Also, referring to FIG. 15, the encoding apparatus may set the pixel values of the upper padding area 1310 of the second face 1120 according to the pixel values of the left edge area 1320 of the first face 1110.

Therefore, the pixel values of the overlapping area between the left padding area 1220 and the upper padding area 1310 may be set to the pixel values padded to the first face 1110 and the pixel values padded to the second face 1120.

In other words, the encoding apparatus performs padding for the padding area corresponding to each face rather than for the entire padding areas of a CMP format image. Therefore, the pixel values of a specific padding area may be set to different values for each face.

At this time, differently from what are described with reference to FIGS. 14 and 15, when the padding process for a CMP format image is expressed by representing the CMP format image in the form of a cube, the encoding apparatus may be changed to perform the padding process by using the center point. In what follows, a padding process using the center point will be described with reference to FIG. 16.

Figure 16:
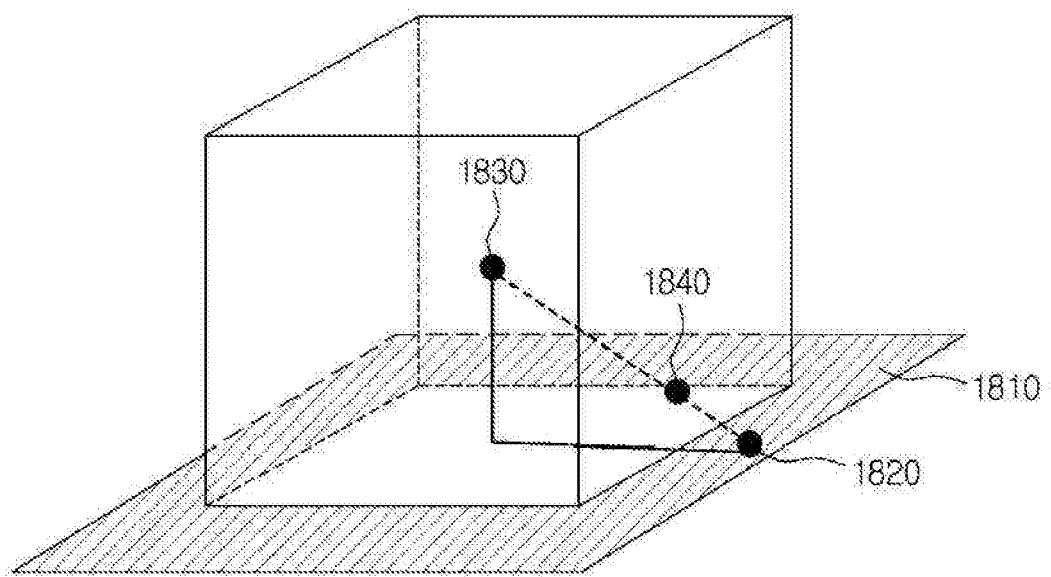
FIG. 16 illustrates an example where an encoding apparatus according to one embodiment of the present invention performs padding by using a center point of a cube map projection format image.

FIG. 16 illustrates an example where an encoding apparatus according to one embodiment of the present invention performs padding by using a center point of a CMP format image.

Referring to FIG. 16, when a CMP format image is expressed in the form of a cube with its surfaces filled by the respective faces of the CMP format image, the encoding apparatus performs a padding process which sets the value of a target point 1820 to the value of an intersection point 1840 where a virtual line connecting the target point 1820 located within the padding area of each face (1810 in the case of a padding area of the face corresponding to the bottom surface of the cube) and the center point 1830 meets any one of the faces. At this time, the center point 1830 refers to a center point in the three-dimensional coordinate system in the form of a cube.

As described above, the encoding apparatus may perform the padding process repeatedly by regarding all of the points located within the padding areas of the entire faces as target points.

Figure 17:
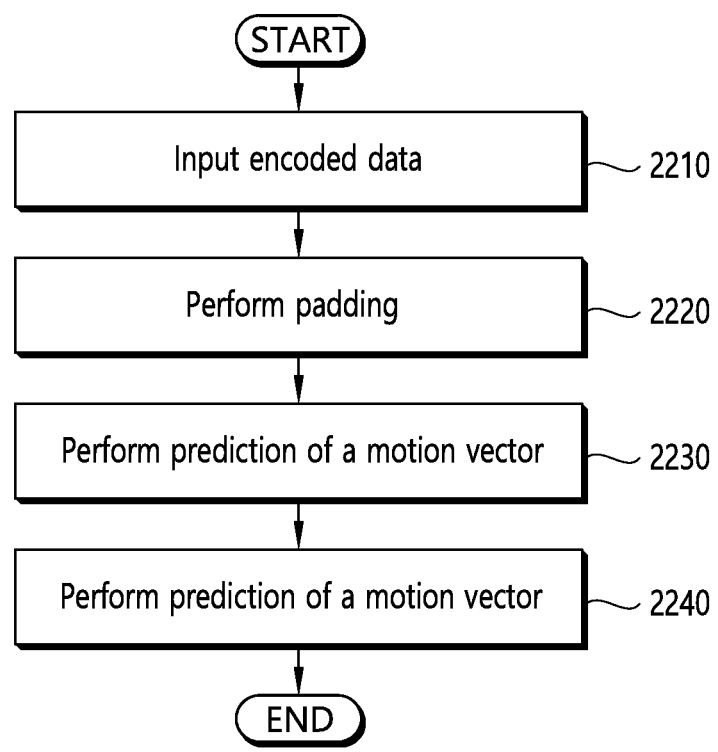
FIG. 17 is a flow diagram illustrating a process for decoding the encoded data of 360-degree images by a decoding apparatus according to one embodiment of the present invention.

FIG. 17 is a flow diagram illustrating a process for decoding the encoded data of 360-degree images by a decoding apparatus according to one embodiment of the present invention.

Referring to FIG. 17, at the step 2210, the decoding apparatus receives encoded data generated by the encoding apparatus.

At the step 2220, the decoding apparatus performs padding on the reference frame. At this time, padding is a process to set each pixel value of a padding area (510 of FIG. 3) which is an edge area outside an image to predict motion vector of a block within a designated search range. At this time, the decoding apparatus may perform padding according to the process described in detail with reference to FIGS. 5 to 16.

At the step 2230, the decoding apparatus extracts a motion vector of a target block to be decoded from the encoded data.

At the step 2240, the decoding apparatus performs decoding of the target block according to the motion vector. At this time, the decoding process for the target block according to the motion vector may employ well-known decoding methods as specified in the related standards.

Therefore, by designating a search range for predicting a motion vector appropriate for 360-degree images or by performing padding, the aforementioned decoding apparatus may perform decoding on the encoded data of each block with a compression factor higher than that provided by conventional encoding methods.

So far, the present invention has been described with reference to the embodiments thereof. Various other embodiments in addition to the embodiments described above may belong to the technical scope defined by the appended claims of the present invention. It should be understood by those skilled in the art to which the present invention belongs that the present invention may be implemented in various other modified forms without deviating from the inherent characteristics of the present invention. In this respect, the disclosed embodiments should be taken into account in a descriptive point of view rather than restrictive point of view. The technical scope of the present invention should be judged by the appended claims rather than the descriptions given above, and all of the discrepancies which may be found within the range equivalent to the technical scope of the present invention should be interpreted to belong thereto.

The invention claimed is:

1. An encoding apparatus, comprising:
a memory configured to store a command for encoding an input image; and
a processor configured to encode the image according to the command,
wherein the processor is configured to perform padding to set pixel values of a padding area corresponding to one edge area of the image by referring to another edge area of the image adjacent to the one edge area on a sphere on which the image is projected, to seek a motion vector by referring to the pixel values of the padding area, and to encode the image by referring to the motion vector,
wherein the image is a 360-degree image, and
wherein, when a reference frame is an Equirectangular projection format image, the processor is configured to perform padding by setting pixel values of a left padding area of the reference frame to pixel values corresponding to a region within a number of columns of the left padding area from the rightmost column of the reference frame and by setting pixel values of a right padding area of the reference frame to pixel values corresponding to a region within a number of columns of the right padding area from the leftmost column of the reference frame.

2. A decoding apparatus, comprising:
a memory configured to store a command for decoding encoded data; and
a processor configured to decode the encoded data according to the command,
wherein the processor is configured to perform padding to set pixel values of a padding area corresponding to one edge area of a reference frame corresponding to the encoded data by referring to another edge area of an image adjacent to the one edge area on a sphere on which the image is projected, to extract a motion vector of a target block to be decoded from encoded data, and to reconstruct a 360-degree image by performing decoding of the target block by referring to the motion vector and the pixel values of the padding area, and
wherein, when the reference frame is an Equirectangular projection format image, the processor is configured to perform padding by setting pixel values of a left padding area of the reference frame to pixel values corresponding to a region within a number of columns of the left padding area from the rightmost column of the reference frame and by setting pixel values of a right padding area of the reference frame to pixel values corresponding to a region within a number of columns of the right padding area from the leftmost column of the reference frame.

3. The decoding apparatus of claim 2, wherein the processor is configured to set pixel values of a first upper padding area to pixel values corresponding to a region within a number of columns of the first upper padding area from the rightmost column among pixels corresponding to a region which ranges from the topmost row of the reference frame down to the row corresponding to a number of rows of the first upper padding area, to set pixel values of a second upper padding area to pixel values corresponding to a region within a number of columns of the second upper padding area from the leftmost column among pixels corresponding to a region which extends from the topmost row of the reference frame down to the row corresponding to a number of rows of the second upper padding area, to set pixel values of a first lower padding area to pixel values of a region within a number of columns of the first lower padding area from the rightmost column among pixels corresponding to a region which extends from the bottommost row of the reference frame up to the row corresponding to a number of rows of the first lower padding area, and to set pixel values of a second lower padding area to pixel values of a region within a number of columns of the second lower padding area from the leftmost column among pixels corresponding to a region which extends from the bottommost row of the reference frame up to the row corresponding to a number of rows of the second lower padding area, wherein the first upper padding area is a region lying in the left side among regions divided from a padding area located in the upper side of the reference frame with reference to a vertical line passing through a center point of the reference frame, wherein the second upper padding area is a region lying in the right side among regions divided from a padding area located in the upper side of the reference frame with reference to a vertical line passing through the center point of the reference frame, wherein the first lower padding area is a region lying in the left side among regions divided from a padding area located in the lower side of the reference frame with reference to a vertical line passing through the center point of the reference frame, and wherein the second lower padding area is a region lying in the right side among regions divided from a padding area located in the lower side of the reference frame with reference to a vertical line passing through the center point of the reference frame.

4. The decoding apparatus of claim 3, wherein the processor is configured to re-arrange a vertical order of pixel values padded to the first upper padding area, the second upper padding area, the first lower padding area, and the second lower padding area in a reverse order.

5. The decoding apparatus of claim 2, wherein the processor is configured to set pixel values of a central upper padding area to pixel values corresponding to a region which extends from the topmost row of the reference frame down to the row corresponding to a number of rows of the central upper padding area and to set pixel values of a central lower padding area to pixel values corresponding to a region which extends from the bottommost row of the reference frame up to the row corresponding to a number of rows of the central lower padding area, wherein the central upper padding area is a region comprising pixels located on a virtual vertical line which passes through each individual pixel belonging to the reference frame among the pixels located in the upper side of the reference frame, and wherein the central lower padding area is a region comprising pixels located on a virtual vertical line which passes through each individual pixel belonging to the reference frame among the pixels located in the lower side of the reference frame.

6. The decoding apparatus of claim 5, wherein the processor is configured to re-arrange a vertical order of the pixel values padded to the central upper padding area and the central lower padding area in a reverse order.

7. The decoding apparatus of claim 2, wherein the processor is configured to reverse an order of horizontal arrangement of pixels corresponding to a region which extends from the leftmost column right to a column corresponding to a number of columns of a first upper padding area among pixels corresponding to a region which extends from the topmost row of the reference frame down to the row corresponding to a number of rows of the first upper padding area, to set pixel values of the first upper padding area to values of the pixels arranged in the reverse order, to reverse the order of horizontal arrangement of pixels corresponding to a region which extends from the rightmost column left to a column corresponding to a number of columns of a second upper padding area among pixels corresponding to a region which extends from the topmost row of the reference frame down to the row corresponding to a number of rows of the second upper padding area, to set pixel values of the second upper padding area to values of the pixels arranged in the reverse order, to reverse the order of horizontal arrangement of pixels corresponding to a region which extends from the leftmost column right to a column corresponding to a number of columns of a first lower padding area among pixels corresponding to a region which extends from the bottommost row of the reference frame up to the row corresponding to a number of rows of the first lower padding area, to set pixel values of the first lower padding area to values of the pixels arranged in the reverse order, to reverse the order of horizontal arrangement of pixels corresponding to a region which extends from the rightmost column left to a column corresponding to a number of columns of a second lower padding area among pixels corresponding to a region which extends from the bottommost row of the reference frame up to the row corresponding to a number of rows of the second lower padding area, and to set pixel values of the second lower padding area to values of the pixels arranged in the reverse order, wherein the first upper padding area is a region lying in the left side among regions divided from a padding area located in the upper side of the reference frame with reference to a vertical line passing through a center point of the reference frame, wherein the second upper padding area is a region lying in the right side among regions divided from a padding area located in the upper side of the reference frame with reference to a vertical line passing through the center point of the reference frame, wherein the first lower padding area is a region lying in the left side among regions divided from a padding reference frame located in the lower side of the reference frame with reference to a vertical line passing through the center point of the image, and wherein the second lower padding area is a region lying in the right side among regions divided from a padding area located in the lower side of the reference frame with reference to a vertical line passing through the center point of the image.

8. The decoding apparatus of claim 7, wherein the processor is configured to re-arrange a vertical order of the pixel values padded to the first upper padding area, the second upper padding area, the first lower padding area, and the second lower padding area in a reverse order.

9. The decoding apparatus of claim 2, wherein the processor is configured to reverse an order of horizontal arrangement of pixels corresponding to a region which ranges from the topmost row of the reference frame down to the row corresponding to a number of rows of a central upper padding area, to set pixel values of the central upper padding area to values of the pixels arranged in the reverse order, to reverse the order of horizontal arrangement of pixels corresponding to a region which ranges from the bottommost row of the reference frame up to the row corresponding to a number of rows of a central lower padding area, and to set pixel values of the central lower padding area to values of the pixels arranged in the reverse order, wherein the central upper padding area is a region comprising pixels located on a virtual vertical line which passes through each individual pixel belonging to the reference frame among the pixels located in the upper side of the reference frame, and wherein the central lower padding area is a region comprising pixels located on a virtual vertical line which passes through each individual pixel belonging to the reference frame among the pixels located in the lower side of the reference frame.

10. The decoding apparatus of claim 9, wherein the processor is configured to re-arrange a vertical order of the pixel values padded to the central upper padding area and the central lower padding area in a reverse order.

11. The decoding apparatus of claim 2, wherein, when the reference frame is a cube map projection format image, the processor is configured to set pixel values of a padding area of one face to pixel values of an edge area of another face which adjoins the edge area of the one face of a cube, each surface of which is formed by the corresponding face of the reference frame.

12. The decoding apparatus of claim 11, wherein the processor is configured to decode the target block included in the one face by referring to the values of pixels padded to the one face of the reference frame.

13. The decoding apparatus of claim 2, wherein, when the reference frame is a cube map projection format image, in a cube with its surfaces filled by the respective faces of the reference frame, the processor is configured to set a value of a target point to a value of an intersection point where a line connecting the target point located on a padding area of one face and a center point of the cube meets another face.

14. A method for decoding encoded data by a decoding apparatus, comprising:
    performing padding to set pixel values of a padding area corresponding to one edge area of a reference frame corresponding to the encoded data by referring to another edge area of an image adjacent to the one edge area on a sphere on which the image is projected;
    extracting a motion vector of a target block to be decoded from the encoded data; and
    reconstructing a 360-degree image by performing decoding of the target block by referring to the motion vector and pixel values of the padding area, and
    wherein, when a reference frame is an Equirectangular projection format image, the processor is configured to perform padding by setting pixel values of a left padding area of the reference frame to pixel values corresponding to a region within a number of columns of the left padding area from the rightmost column of the reference frame and by setting pixel values of a right padding area of the reference frame to pixel values corresponding to a region within a number of columns of the right padding area from the leftmost column of the reference frame.

15. The method of claim 14, wherein the performing padding to set pixel values of a padding area corresponding to one edge area of a reference frame corresponding to the encoded data by referring to another edge area of the image adjacent to the one edge area on a sphere on which the image is projected comprises,
    when the reference frame is an Equirectangular projection format image or a panorama image, setting pixel values of a left padding area of the reference frame to pixel values corresponding to a region within the number of columns of the left padding area from the rightmost column of the reference frame; and
    performing padding by setting pixel values of a right padding area of the reference frame to pixel values corresponding to a region within the number of columns of the right padding area from the leftmost column of the reference frame.

16. The method of claim 14, wherein the performing padding to set pixel values of a padding area corresponding to one edge area of the reference frame by referring to another edge area of the reference frame adjacent to the one edge area on a sphere on which the reference frame is projected comprises,
    setting pixel values of a first upper padding area to pixel values corresponding to a region within a number of columns of the first upper padding area from the rightmost column among pixels corresponding to a region which ranges from the topmost row of the reference frame down to the row corresponding to a number of rows of the first upper padding area;
    setting pixel values of a second upper padding area to pixel values corresponding to a region within a number of columns of the second upper padding area from the leftmost column among pixels corresponding to a region which extends from the topmost row of the reference frame down to the row corresponding to a number of rows of the second upper padding area;
    setting pixel values of a first lower padding area to pixel values of a region within a number of columns of the first lower padding area from the rightmost column among pixels corresponding to a region which extends from the bottommost row of the reference frame up to the row corresponding to a number of rows of the first lower padding area; and
    setting pixel values of a second lower padding area to pixel values of a region within a number of columns of the second lower padding area from the leftmost column among pixels corresponding to a region which extends from the bottommost row of the reference frame up to the row corresponding to a number of rows of the second lower padding area,
    wherein the first upper padding area is a region lying in the left side among regions divided from a padding area located in the upper side of the reference frame with reference to a vertical line passing through a center point of the reference frame,
    wherein the second upper padding area is a region lying in the right side among regions divided from a padding area located in the upper side of the reference frame with reference to a vertical line passing through the center point of the reference frame,
    wherein the first lower padding area is a region lying in the left side among regions divided from a padding area located in the lower side of the reference frame with reference to a vertical line passing through the center point of the reference frame, and
    wherein the second lower padding area is a region lying in the right side among regions divided from a padding area located in the lower side of the reference frame with reference to a vertical line passing through the center point of the reference frame.

17. The method of claim 16, wherein the performing padding to set pixel values of a padding area corresponding to one edge area of the reference frame by referring to another edge area of the reference frame adjacent to the one edge area on a sphere on which the reference frame is projected further comprises,
    re-arranging a vertical order of pixel values padded to the first upper padding area, the second upper padding area, the first lower padding area, and the second lower padding area in a reverse order.

18. The method of claim 14, wherein the performing padding to set pixel values of a padding area corresponding to one edge area of the reference frame by referring to another edge area of the reference frame adjacent to the one edge area on a sphere on which the reference frame is projected comprises, setting pixel values of a central upper padding area to pixel values corresponding to a region which extends from the topmost row of the reference frame down to the row corresponding to a number of rows of the central upper padding area; and setting pixel values of a central lower padding area to pixel values corresponding to a region which extends from the bottommost row of the reference frame up to the row corresponding to a number of rows of the central lower padding area, wherein the central upper padding area is a region comprising pixels located on a virtual vertical line which passes through each individual pixel belonging to the reference frame among the pixels located in the upper side of the reference frame, and wherein the central lower padding area is a region comprising pixels located on a virtual vertical line which passes through each individual pixel belonging to the reference frame among the pixels located in the lower side of the reference frame.

19. The method of claim 18, wherein the performing padding to set pixel values of a padding area corresponding to one edge area of the reference frame by referring to another edge area of the reference frame adjacent to the one edge area on a sphere on which the reference frame is projected further comprises, re-arranging a vertical order of the pixel values padded to the central upper padding area and the central lower padding area in a reverse order.

20. An encoding apparatus, comprising:

a memory configured to store a command for encoding an input image; and a processor configured to encode the image according to the command, wherein the processor is configured to perform padding to set pixel values of a padding area corresponding to one edge area of the image by referring to another edge area of the image adjacent to the one edge area on a sphere on which the image is projected, to predict seek a motion vector by referring to the pixel values of the padding area, and to encode the image by referring to the motion vector, wherein the image is a 360-degree image, and wherein, when a reference frame is an Equirectangular projection format image, the processor is configured to perform padding by setting pixel values of a upper padding area of the reference frame to pixel values corresponding to a region within a number of columns of the upper padding area from the uppermost row of the reference frame and by setting pixel values of a lower padding area of the reference frame to pixel values corresponding to a region within a number of columns of the lower padding area from the lowermost row of the reference frame.

21. A method for decoding encoded data by a decoding apparatus, comprising:

performing padding to set pixel values of a padding area corresponding to one edge area of a reference frame corresponding to the encoded data by referring to another edge area of the image adjacent to the one edge area on a sphere on which the image is projected;

extracting a motion vector of a target block to be decoded from the encoded data; and reconstructing generating a 360-degree image by performing decoding of the target block by referring to the motion vector and pixel values of the padding area, wherein, when a reference frame is an Equirectangular projection format image, the processor is configured to perform padding by setting pixel values of a upper padding area of the reference frame to pixel values corresponding to a region within a number of columns of the upper padding area from the uppermost row of the reference frame and by setting pixel values of a lower padding area of the reference frame to pixel values corresponding to a region within a number of columns of the lower padding area from the lowermost row of the reference frame.

* * * * *